Oct. 27, 1936.    J. E. PADGETT    2,058,819
UNIVERSAL JOINT
Filed Aug. 4, 1933
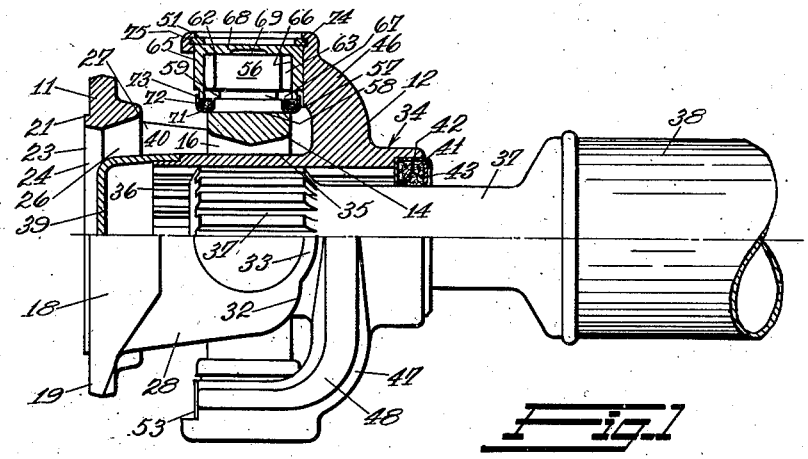
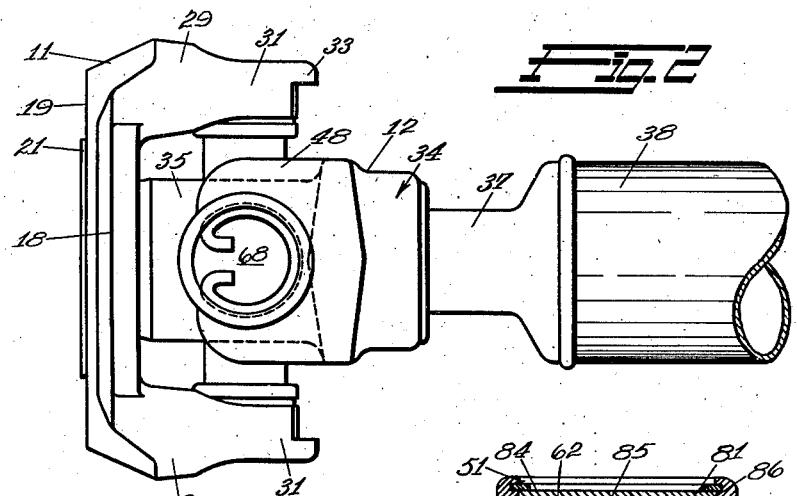
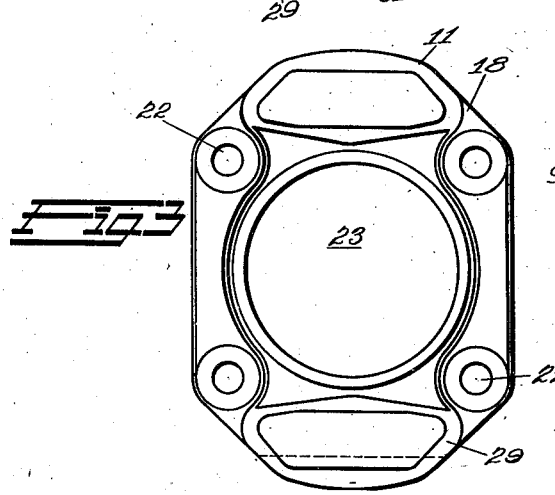
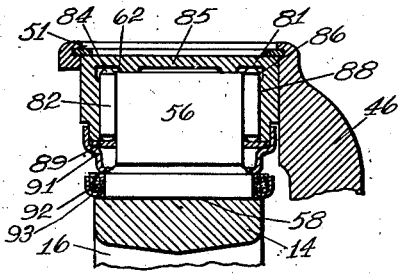
Inventor
Joseph E. Padgett
Strauch & Hoffman
Attorneys.

Patented Oct. 27, 1936

2,058,819

UNITED STATES PATENT OFFICE 2,058,819

UNIVERSAL JOINT

Joseph E. Padgett, Toledo, Ohio

Application August 4, 1933, Serial No. 683,677

11 Claims. (Cl. 64—17)

The present invention relates to universal joints and more particularly to drive couplings for transmitting power from one drive member or shaft to another at an angle thereto, in which provision must be made for permitting relative movement between the drive coupling and one of the drive members or shafts.

In mechanical drives where substantial amounts of power are transmitted from one power transmitting member to another through a universal joint of the type fully disclosed in my copending application Serial Number 660,594, filed March 13, 1933, now matured into Patent No. 2,032,497 issued March 6, 1936, employing trunnion bearings of the type, in which slidable and rotatable bearing elements are used, substantial axial movement of one of the power transmitting members relative to the universal joint causes end thrusts to develop under some circumstances in the drive connection which joins the axially movable member to the universal joint. Such thrusts may interfere with the group and individual action of the bearing elements.

A splined shaft and sleeve is commonly used for this drive connection and its location relative to the trunnion bearings of the universal joint governs the end thrust which is transmitted from the shaft to the sleeve. The preferred location of the splined connection in the present invention is in the axis of the universal joint trunnions which results in substantial elimination of end thrust and according to my invention to be fully disclosed hereinafter the span of the joint trunnions is increased which permits location of the splined connection in the center of the joint itself, enabling use of the preferred type of trunnion bearings and use of a larger size spline which has the further effect of aiding in the elimination of end thrust and producing a better balance of the rotating parts as will be fully described.

Therefore it is a primary object of the present invention to provide a novel universal joint having permanently lubricated substantially wear free bearings suitable for use in drive mechanisms wherein provision is made at the center of the joint for relative movement between the universal joint and one element of the drive mechanism.

A further object of the present invention is to provide a novel universal joint combined with a substantially wear free and permanently lubricated trunnion bearings employing needle bearing elements in which end thrust between the universal joint and an associated relatively movable shaft is substantially eliminated whereby the needle bearings may function in the intended manner.

A still further object of my invention is to provide a novel wide span universal joint construction in combination with a relatively large splined connection between the driven shaft and the universal joint located adjacent the center of the joint to reduce end thrust due to torque and improve the balance of the rotating parts by substantially reducing the tendency of the shaft to move from its true center because of slight inaccuracies and looseness in the spline.

Still another object of the present invention is to provide novel universal joints having substantially wear free and permanently lubricated trunnion bearings, in combination in a drive mechanism employing two universal joints operatively joined by a drive shaft having a splined connection with one or both of the joints located in the axis of the trunnions of the joint or joints whereby to prevent crimping of the splined connection and therefore to substantially eliminate transmission of end thrust through the splined connection to the trunnions of the joints and also to preserve the true alignment of the shaft and spline connected universal joint members.

Other objects and advantages of the present invention will appear from the following description and from the appended claims read in connection with the attached drawing in which:

Figure 1 is a view in side elevation of a universal joint embodying my invention, taken partly in section on line I—I of Figure 3 to illustrate the trunnion bearing and details of the construction and location of the splined connection.

Figure 2 is a view in plan of the joint of Figure 1 illustrating further details of construction.

Figure 3 is an end elevation of the joint of Figure 1 as viewed from the left.

Figure 4 is a fragmentary view similar to Figure 1 drawn to the same scale, showing a modified form of trunnion bearing.

The invention will be hereinafter described as applied to the driving system of a motor vehicle. While I have chosen to describe and illustrate my invention in connection with a motor vehicle drive, it is to be understood that the invention is not so limited but may be effectively practiced in any type of drive mechanism in which power is to be transmitted from one power transmitting member to another at an angle thereto in which provision is to be made for relative motion between one power transmitting member and the universal joint or joints.

Referring to the drawing, in detail, the universal joint of the present invention preferably formed of a suitable metal comprises a yoke 11, a yoke 12 and a trunnion carrying member 14. This latter member is in the form of an annulus with a central aperture 16 of relatively large diameter, concentric with the axes of yokes 11 and 12 when they are in alignment. When, in the normal operation of the universal joint, the axes of yokes 11 and 12 are not in alignment, the center of aperture 16 corresponds to the point of intersection of these axes.

The body 18 of yoke 11 is preferably finished with a flat face 19 formed with a flange 21 to provide for connection to a suitable driving or driven element, not forming a part of this invention and description thereof is omitted. Driving connection may be secured through bolts or other fastening means passed through suitable holes 22 formed in face 19.

A centrally located aperture 23 in body 18 defined by inclined annular walls 24 and 26 accommodates a projecting portion of yoke 12 in a manner to be hereinafter described.

Two spaced arms 27 and 28 which extend from the body 18 of the yoke are preferably formed integrally therewith and terminate at a point where they are spaced some distance apart. The arms 27 and 28 may be formed as illustrated with a stocky portion 29 nearest body 18 and portion 31 which is relatively narrower in cross-section so as to combine strength and lightness and allow the necessary clearances between the parts in operation. The sides of the arms are taken laterally to form in effect strengthening ribs 32. A narrow arcuate portion 33 extends beyond the ribs for a purpose to be described.

Yoke 12 has provided thereon a relatively long body 34 which extends within the central aperture 16 of the annulus 14 as indicated by reference character 35. The interior of the body has splines 36 for driving engagement with a splined member 37 carried by tube 38 forming, in the example selected for illustration of the invention, the propeller shaft of a motor vehicle driving system. The extension 35 of the body or hub 34 is reduced in cross section near its end to receive a cap 39 which fits thereover and seats against the shoulder 40. This cap is permanently assembled with the extension 35.

A packing washer 41 which may be of felt or other suitable material closely embraces member 37 and is held in a retaining ring 42 seated in an annular recess of appropriate shape at the end of the bars in body 34. A flat annular cover plate 43 bears against the crimped over edge of ring 42 and confines the packing 41 laterally. The packing washer 41 bears on the outer periphery of splined member 37 and cooperates with cap 39 to retain suitable lubricant within the splined interior of yoke 12 and to exclude dirt and other foreign matter.

Yoke 12 is provided with arms 46 and 47 which extend from the body 34 of the yoke, the ends of these arms also terminating at a point where they are spaced some distance apart. Strengthening ribs 48 add stiffness and rigidity to these parts without substantially increasing their weight. The narrow portion 33 extends beyond the ribs 48 in a manner similar to that described in connection with arms 27 and 28 and ribs 32.

At the end of each spaced arm a circular aperture is provided which pierces the overhanging portion 33 such as the aperture 51 in arm 46, the apertures in the spaced arms of each yoke being disposed in alignment with one another. The peripheral wall of each aperture is interrupted to provide a lateral opening 52 bounded on one edge by narrow portion 33 in the end of each arm for a purpose to be hereinafter described. The wall of the apertures in arms 27 and 28 is buttressed by ribs 32 and in arms 46 and 47 by ribs 48 so that the omission of metal at the openings does not weaken the structure.

To connect the spaced yoke arms in relatively movable relation, trunnion carrying member 14 is provided. The trunnion carrying member is preferably in the shape of a ring as previously described and has four trunnions formed thereon, such as trunnion 56 (Figure 1), which are arranged at 90° intervals around the main ring portion 14, the opposing trunnions being in alignment with one another. The surface of each trunnion 56 is hardened, ground and polished for a purpose to be later described. Trunnions 56 are separated from the main portion 14 by a circular neck 57 which is smaller in diameter than the width of portion 14 to furnish a flat circular face 58. A short reduced section surmounting the neck 57 provides a ledge 59.

It will be noted that the ring 14 is of a size to fit within the spaced arms of the yokes and that the mass of the ring is symmetrical with respect to the normal axis of the universal and while of ample strength it is of relatively small mass, thereby maintaining the moment of inertia of the universal with respect to its normal axis at a minimum.

The aligned apertures in the spaced yoke arms are provided with bearing elements within which the corresponding aligned trunnions are arranged to rotate. Since all the apertures together with their associated bearing elements and trunnions are identical, description will be confined to a single aperture 51 shown in detail in Figure 1.

Apertures 51 and the openings 53 are of such size that trunnions 56 can be inserted therein by sliding the ring member 14 over the extension 35 and when inserted are accommodated therein with an annular space 62 disposed therearound. Within space 62 and disposed adjacent and in annular relation to trunnion 26, is an annulus of individual bearing elements 63. Elements 63 are cylindrical in shape, somewhat resembling a needle, with the ends thereof flattened in the modification of Figure 1 to provide a cross-section of maximum area at right angles to the axis of the cylinder.

Space 62 is sufficiently large to accommodate a tubular sleeve forming an external bearing race 65. Sleeve 65 is formed with a hardened, ground and polished inner surface 66 which contacts with the sides of cylindrical needles 63 and serves as an outer race therefor. The needles 63, it will be noted are somewhat shorter than the sleeve 65 and free to slide longitudinally in the sleeve under the action of centrifugal force and gravity. This sliding aids in distributing lubricant over the races in operation and in equalizing wear that may occur. One end of race 65 is open at 67 and the opposite end is closed to form a sealing cap designated at 68. Cap 68 is preferably formed integral with race 35, not only to economize on manufacturing costs, but to provide a more perfect lubricant seal for the bearing.

A recess 69 in cap 68 provides space for lubricant and may if desired cooperate with a similar recess formed within trunnion 56 to accommodate a larger quantity of lubricant if desired. Pressed in place and abutting the face 58 is an annular member 71 having a cup-shaped cross section as shown in Figure 1. Within the cupped portion of member 71, is fitted a circular gasket 72 of packing material such as cork or the like. It will be noted that in the assembly as illustrated in Figure 1, the lower rim of race 65 rests upon and may slightly press into gasket 72 to insure a sealed fit. Member 71 is further formed with an external lip 73 extending above and telescoping about the lower rim of race 65 to provide a more effective seal. By reason of lip 73 and packing 72, foreign matter cannot enter the bearing in operation, since its entry is opposed by centrifugal force.

When trunnion 56, bearing elements 63 and race 65 are assembled within aperture 51, movement of the bearing assembly away from the axis of the universal joint under the influence of centrifugal force is prevented by the ends of elements 63 contacting with cap 68. A small space may if desired be allowed between the end of trunnion 56 and cap 68 for the passage of lubricant to elements 63. Movement of cap 68 away from the axis of the universal joint is prevented by the provision of a ring 74 which is preferably of the type illustrated in my said copending application previously referred to, fitting in a recess 75. The ring 74 is of sufficient width to project beyond recess 75 and engage the top of cap 38, thereby preventing its outward displacement away from the axis of the universal. Movement of the bearing assembly toward the axis of the universal is prevented by contact of the rim of race 65 with gasket 72 held in position by member 71.

The lubricant in the bearing is prevented from escaping at the interior end of needles 63 by gasket 72 cooperating with the lower rim of race 65. Lip 73, extending above the lower edge of race 65 and gasket 72, prevents the ingress of dirt and moisture to the bearing as well as loss of lubricant therefrom.

The bearing structure so far described is, with the exception of minor detail, identical with that described in my copending application, Serial Number 660,594, filed March 13, 1933, and reference may be had thereto for a full and complete description of the operation and behavior of the bearing just described. However, the following brief description of the bearing operation is appended for the purpose of clarifying the description of the novel combinations claimed herein.

It is to be noted that annular space 62, defined by race 65 and trunnion 56, is of a width slightly larger than the diameter of the contained needles 63, providing a clearance between the needles and the races which must be of sufficiently greater than normally used in roller bearing practice, to permit the needles to be out of contact with the inner race on the unloaded side of the trunnion when they are forced against the outer race in operation to prevent a normal roller bearing action from occurring, which must be avoided if the joint is to operate properly. Deformation of the outer race is necessary to bring a substantial number of needles into load carrying contact with the trunnions because the necessary radial clearance between the races and the needles results in a greater curvature of trunnion surface than the curvature of the surface of tangency of the needles, and the outer race 65 is designed to permit such deformation.

Likewise, it will be noted that the needles 63 are of such diameter with reference to the area of annular space 62 that a small space is defined between each individual needle. Owing to minute irregularities of the needles and races, the needles may tend to skew while under load, and this aggregate space in practice must be sufficient to permit the axes of the needles to return to parallel alignment after skewing when the load pressure thereon is relieved. The aggregate clearance between the needles should preferably be less than a whole needle, and I prefer to make it sufficiently small so that when the needles and outer race are coated with lubricant, the needles will stay in place when assembled in the outer race with the trunnion removed and the race resting on its side.

The proper clearances form a distinct and important part of the bearing just described, and in the present invention I have provided a novel arrangement for maintaining these clearances by substantially eliminating end thrust on the joint.

It will be noted that unlike the common type of roller or ball bearings, no cage or retainer is provided within which the bearings are supported in spaced relation and are free to rotate. The omission of the cage permits the use of a considerably greater number of load supporting rollers, materially increasing the bearing pressures that may be transmitted in a given size bearing.

It is also to be noted that omission of a cage enables the lubricant coated needles to contact one with another along lines extending their entire length. This contact together with the contact with the lubricant coated races tends to retard rotation of the needles about their own axis to a great extent. With the proper lubricant, and clearances, the bearing becomes a sliding bearing and the individual needles cooperate to form a sliding or creeping sleeve or bushing between the races, the elements of which tend to rotate under load.

The flat-finished ends of needles 33 during rotation of the universal are thrown outwardly against the interior surface of cap 68 of race 65 by centrifugal force and by reason of the relatively high friction factor developed, rotation of the individual needles is retarded and the formation of the sliding or creeping sleeve is aided.

A further important factor is the presence of proper lubricant within the bearing. A lubricant of the proper consistency, preferably a heavy, more or less viscous lubricant such as is used in automotive transmissions and axle differentials, is placed within the bearing at the time of its assembly. By reason of the clearance allowed between the individual needles 63, trunnion 56 and external race 65, a series of small triangular-shaped spaces approximating capillaries in size are formed which tend to retain the lubricant in contact with all portions of the needles. Because of the cohesion between the lubricant particles and the adhesion between the lubricant and the needles and adjacent races, the sleeve formed by the needles tends to become an integral sliding unit, the unity being broken only upon the application of a load, which causes the needles under load to rotate about their own axes.

Under a heavy applied load the force of the load is not concentrated upon a few needles, but is distributed over a substantial number of needles due to the race deformation and lubricant effect. When under load by reason of the proper clearance between the needles, proper lubrication, proper clearance between the races, and proper outer race design, the needles are coated with lubricant and preferably spaced thereby sufficiently to take up the aggregate clearance between the needles and the lubricant coated needles are brought into contact with one another.

The needles and lubricant in the loaded bearing are formed into wedges on opposite sides of the center of the pressure zone by the load application, the extent of the wedges varying to a maximum of approximately 90° on each side of the center of the pressure zone to bring a substantial number of the needles into load supporting contact.

The foregoing analysis of the bearing operation has been made with the assumption that there is no relative rotation between the trunnion and yoke. In such a case there is no rotation of the needles and no shifting or creeping. Under conditions of load where there is relative rotation of the trunnion and yoke the needles creep and slide in groups as fully described in my aforesaid application until the lubricant film breaks down between the needles under pressure and the races so that a sufficient friction factor is developed therebetween to cause one or more of the needles to roll about their own axis and to pass from one pressure zone to another. Because of the minute variations in needle diameter, lubricant distribution and other factors, a variable creeping of the sleeve or rollers with variable rotation of the needles under load occurs.

As the relative rotation reverses with a reversal of oscillation of the joint, creeping of the rollers in the opposite direction will occur. This variable reverse creeping, occurring in accordance with the oscillation of the trunnion causes a constant change in position of the needles with the result that in practice it is found that the wear on the needles is distributed materially prolonging the life of the bearing. The position of the needles with reference to the races is constantly changing so that the wear upon the races is evenly distributed, thereby removing any danger of the needles lapping themselves or forming grooves in either trunnion 56 or race 65.

The joint of the present invention enables the proper operation outlined above of the needle bearings to be attained where provision is to be made for relative movement of one of the drive members and the joint which in the specific embodiment described above occurs between splined member 37 and yoke 12 and the accomplishment of this purpose will now be described in detail:

As described in connection with Figure 1, member 38 may be the propeller shaft of a motor vehicle which in the conventional arrangement is operatively connected to a drive axle (not shown) interconnected with the load carrying and power plant section of the vehicle by springs. The yoke 11 in the conventional automotive drive arrangement is connected to be driven by an engine sustained by the spring supported power plant section. Because of the spring suspension the splined connection of member 37 and yoke 12 is provided to allow for axial movement of member 37 with respect to yoke 12. It will be seen that if the members of the splined connection cannot telescope freely, end thrust will be transmitted to the universal joint.

In the specific embodiment chosen for illustration of the invention, the shaft 38 is supported substantially at the center of the joint in line with the trunnions 56. This eliminates the tendency toward binding between the splines which always occurs when the weight of the shaft 38 is supported at some point lying outside of the axial center lines of the trunnions 56.

This latter and undesirable construction is exemplified by the arrangement of the yoke and shaft known as a "broken back" construction in which the splined portion of the shaft cooperates with an internal spline lying beyond and outside of the point of connection with the yoke arms. If this undesirable "broken back" arrangement were used it is to be noted that in the embodiment illustrated the splined connection would occur between the points of support of shaft 38, namely the trunnion 56 and the connection between the shaft and the axle or other member to which it imparts driving force. If a second universal joint is used for this final drive connection the bad effect of the arrangement is increased particularly where two splined connections are present between the points of support of the shaft. In this latter arrangement of a driving system, means will be provided for keeping the shaft from freely floating back and forth in the joints.

The end thrust produced at the splined connection is a combination of sliding friction between the cooperating sides of the splines on the driving and driven member due to torque and the added thrust caused by the crimping action when the spline is suspended between the points of support of the shaft following the "broken back" arrangement outlined above. If there is a little looseness it results in the spline trying to dig in on one side of the splined sleeve and this adds to the end thrust.

The foregoing serious disadvantages are eliminated by use of the joint of this invention as there is no tendency to binding and cramping of the splined connection or connections and therefore the splines transmit only a relatively small end thrust, namely that due to sliding friction between the splines and this is reduced further by the exclusion of dirt and foreign matter by cap 39 and packing washer 41 which serves to hold lubricant within the splined connection.

A further advantage of the joint of my invention arises from the possibility of making the spline size greater to reduce the end thrust due to sliding friction caused by torque.

With the larger spline sizes made possible in the joint of my invention the importance of the advantage last above mentioned is enhanced because of the good effect on balance since slight inaccuracies and looseness in the spline do not allow the shaft to move as far from its true center as it does in the conventional constructions discussed above. It will be understood that a few thousandths of an inch off center is sufficient to cause serious vibration at a high speed in a unit of the type described.

It will be seen from the foregoing that the substantial elimination of uncertain end thrusts, made possible by the practice of the invention described herein, permits proper operation of the needle bearings of the trunnions and has a tendency to cause the load to shift uniformly from one group of needles to another and thus these bearings have an indefinitely long life and do not require relubrication after the joint is assembled.

From the foregoing description taken in connection with the discussion of the preferred method of assembly of the needle bearings disclosed in my copending application previously referred to, the method of assembly of the embodiment of the universal joint of my invention described herein will be apparent.

For the sake of completeness of description, the preferred method of assembly of the embodiment illustrated will be given briefly:

In the preferred method of assembling my improved universal, ring member 14 is introduced over the projection 35 and is advanced to the right as viewed on Figure 1 of the drawing until oppositely disposed trunnions 56 with gaskets 71 thereon pass into the apertures 51 in arms 46 and 47 through the openings 53 in their walls. It is obvious that ring 14 could be first positioned with a pair of aligned trunnions in the apertures of the arms of yoke 11. Lubricant is placed within race 65 and an excess number of needles 63 placed therein. Upon shaking or subjection to centrifugal force, the required number of needles 63 coated with lubricant are deposited in an annular arrangement around the interior of race 65. The excess needles are thin and readily removed. Due to the clearance desired between the needles, they are readily assembled within race 65 and are retained in position by the adhering lubricant. The race 65 may then be conveniently turned upon its side without the needles changing position when the preferred needle clearances are used.

The race 65 with the needles 63 therein is then placed over the trunnion 28 by insertion into aperture 51. Ring 74 is now engaged in the recess 75 to hold the race 65 in place, the ring bearing against the cap 68. The opposite trunnion is then similarly assembled.

The second yoke is now assembled to the ring 14 by being positioned with its aligned apertures enclosing the remaining trunnions on the ring and the bearing elements introduced therein as described above.

Figure 4 shows a slightly modified form of needle bearing and needle bearing assembly adapted to use in the larger size joints. In this form of bearing the annular space 62 accommodates a sleeve 81 forming the external bearing race. The sleeve 81 is similar to the sleeve 65 described above in connection with Figure 1 and performs a similar function. The needles 82 are cylindrical in shape with their ends beveled in the form of a truncated cone as indicated by reference character 84. The closed end 85 of the sleeve or race 81 preferably formed integrally therewith serves to provide a perfect lubricant seal for the bearing.

A circular groove 86 is formed in the face of the closed end 85 of the sleeve and conforms approximately in cross-sectional shape to the conical ends of needles 82. Clearance at the ends of the needles is provided by forming the groove 86 partly in the inner wall 88 of the sleeve.

The needles 82 are retained in place by an annular member 89 preferably in the form of a sheet metal stamping. A cap member 91 is pressed into place over the open end of the sleeve 81 and serves to retain the member 89 in position effectively to confine the needles within the bearing space. A circular gasket 92 of packing material similar to the gasket 72 of Figure 1 is seated over the trunnion 56 against the circular face 58 of the ring member 14. The gasket 92 is held in place against undue distortion by an annular member 93 cup shaped in cross section. The outer flat face of the gasket 92 is pressed against the inner face of the cap member 91 in the assembled position of the parts to prevent escape of lubricant.

From the description of the operation and assembly of the bearing of Figure 1, it is believed that the operation and assembly of the embodiment of Figure 4 will be apparent. It is to be noted however, that the retaining ring 89 and the cap member 91 are assembled to the race 81 containing the needles before the race is introduced into an aperture 51 and over a trunnion 56. Gaskets 92 and retaining members 93 are assembled to the trunnions prior to the introduction of ring member 14 between the arms of the yokes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a driving mechanism, a driving member, a driven member, a universal joint comprising a pair of yoke members and a trunnion member operatively connected to said driving member, a splined connection between said driven member and said universal joint whereby to permit relative endwise movement between said joint and said driven member, said universal joint yoke members and said trunnion member joint being so constructed as to accommodate said splined connection which is of relatively large diameter and located within the center of said universal joint whereby to aid in reducing the end thrust transmitted to said universal joint due to torque.

2. In a driving mechanism, a driving member, a driven member, a universal joint operatively connected to said driving member, a splined connection between said driven member and said universal joint whereby to permit relative endwise movement between said joint and said driven member, said joint being so constructed as to accommodate said splined connection which is of relatively large diameter and located substantially between the trunnions of said universal joint whereby to offset the tendency of the spline connected member to move from its true center.

3. A universal joint comprising two yokes, each yoke having outwardly extending arms terminating in bearing apertures, a trunnion carrying ring provided with trunnions seated in said bearing apertures, one of said yokes having a unitary hollow extension extending within said trunnion carrying ring, the interior of said hollow extension being provided with splines adapted to receive a splined drive member in substantial alignment with said trunnions.

4. The universal joint defined by claim 3, said hollow extension being closed by a lubricant retaining cover, and the other of said yokes having means for attachment to a suitable driving or driven element.

5. The universal joint defined by claim 3, each of said apertures retaining a bearing for said trunnion comprising a plurality of independent slidable and rotatable needle bearings arranged in annular relation with respect to said trunnion.

6. A universal joint comprising two yokes having relatively widely spaced arms, trunnion bearings in said arms, one of said yokes having a body portion of substantially annular form providing an opening and means for attachment of said yoke to a driving or driven member, and the other of said yokes having a hub and a sleeve-like part integral with said hub arranged opposite said opening, lubricant sealing means on said hub, splines on said sleeve-like part, a ring having trunnions journalled in the bearings of said arms, said ring surrounding said sleeve-like part, and closure means cooperating with said lubricant sealing means to confine lubricant in said sleeve-like part, said closure means being accommodated in said opening to permit of relative angular movement between said yokes.

7. A universal joint comprising two yokes provided with spaced arms, a trunnion carrying ring, axially aligned trunnions on said ring journalled in said arms, and a sleeve on one of said yokes and extending between the arms thereof, said sleeve being internally splined to receive the splined end of a drive member extending within and centered with respect to a plane passing through the axis of said trunnions on said trunnion carrying ring.

8. A universal joint comprising two yokes provided with spaced arms, a trunnion carrying ring, trunnions on said ring axially aligned in pairs and journalled in bearings in said arms, a sleeve on one of said yokes extending between the arms of said yokes and provided with internal splines adapted for connection with the splined end of a drive member which splined end extends into said sleeve to lie approximately in the plane of said ring, and a closure member for the end of said sleeve, the other of said yokes being provided with means for attachment to a suitable driving or driven element.

9. A universal joint comprising two yokes having spaced arms, one of said yokes being of annular form providing an opening, and the other having a sleeve-like part arranged opposite said opening, said sleeve-like part being internally splined to receive the splined end of a drive member, a ring having trunnions journalled in bearings in said arms, said ring surrounding said sleeve-like part, lubricant sealing means adjacent one end of said sleeve-like part adapted to cooperate with the end of a drive member extending from said sleeve and a closure member at the other end of said sleeve-like part, said sealing means and said closure member serving to confine lubricant within the splined interior of said sleeve.

10. In a driving mechanism, a universal joint comprising two yoke members having spaced arms and an annular trunnion carrying member, two pairs of axially aligned trunnions on said annular member received in bearing apertures provided in the ends of said arms, an internally splined sleeve-like projection formed on one of said yoke members and extending inwardly of said joint and through said annular member, a drive shaft extending into said sleeve-like projection, a splined end on said drive shaft cooperating with the splines in said projection, said splined end lying within said annular member and the length thereof axially of said shaft being substantially equal to the width of said annular member so that friction in said splined connection is reduced and the transmission of end thrust from said shaft to said extension through said splined connection is thereby materially lessened.

11. In a driving mechanism, a universal joint comprising two yoke members having spaced arms and an annular trunnion carrying member, two pairs of axially aligned trunnions on said annular member received in bearing apertures provided in the ends of said arms, one of said yokes having a hub and an internally splined sleeve-like projection integral with said hub and extending inwardly of said joint through said annular member, a drive shaft extending into said sleeve-like projection, lubricant sealing means on said hub cooperating with said shaft, closure means closing the end of said projection, a splined end on said drive shaft cooperating with the splines in said projection, said splined end lying within said annular member and the length thereof axially of said shaft being substantially equal to the width of said annular member, so that friction in said splined connnection is reduced, said sealing means and closure means cooperating to confine lubricant in said extension to effectively lubricate said splined connection and exclude dirt therefrom.

JOSEPH E. PADGETT.